United States Patent [19]

Katz

[11] Patent Number: 5,577,529
[45] Date of Patent: Nov. 26, 1996

[54] TAPPING FITTINGS

[75] Inventor: Oded Katz, D.N. Menashe, Israel

[73] Assignee: Plasson Maagan Michael Industries Ltd., D. N. Menashe, Israel

[21] Appl. No.: 375,091

[22] Filed: Jan. 19, 1995

[51] Int. Cl.$^6$ .......................... F16K 43/00; F16K 49/00; F16L 41/06
[52] U.S. Cl. ................ 137/318; 30/93; 219/544; 251/267; 285/197; 408/67; 408/101
[58] Field of Search ................... 83/54; 137/318; 219/535, 544, 547, 548; 285/21, 156, 197, 198, 199, 286; 408/67, 83.5, 87, 95, 204, 72 R, 101; 251/264, 267, 268, 269, 270; 30/92, 93, 94, 95, 96

[56] References Cited

U.S. PATENT DOCUMENTS

| | | | |
|---|---|---|---|
| 1,425,708 | 8/1922 | Springborn | 251/268 |
| 1,652,929 | 12/1927 | Cawood | 251/267 |
| 1,974,254 | 9/1934 | Allen et al. | 251/268 |
| 2,321,597 | 6/1943 | Hobbs | 251/267 |
| 2,653,839 | 9/1953 | Middendor | 403/374 |
| 2,790,652 | 4/1957 | Risley et al. | 285/197 |
| 2,843,924 | 7/1958 | Franck | 72/317 |
| 3,460,553 | 8/1969 | Leopold, Jr. et al. | 137/318 |
| 3,739,147 | 6/1973 | Mayhew et al. | 219/535 |
| 3,756,261 | 9/1973 | Minchoff | 137/318 |
| 3,896,842 | 7/1975 | Cole | 137/318 |
| 4,063,844 | 12/1977 | Pessia | 137/318 |
| 4,292,503 | 9/1981 | Brent | 219/535 |
| 4,391,458 | 7/1983 | Blakeley | 285/197 |
| 4,541,447 | 9/1985 | Soumar et al. | 137/318 |
| 4,598,731 | 7/1986 | Colson | 137/318 |
| 4,669,926 | 6/1987 | Wilcox, Jr. | 408/1 R |
| 4,682,797 | 7/1987 | Hildner | 285/40 |
| 4,809,735 | 3/1989 | Volgstadt et al. | 137/318 |
| 4,903,397 | 2/1990 | Freidel | 29/611 |
| 5,345,964 | 9/1994 | Friedel | 137/318 |
| 5,348,045 | 9/1994 | Servé | 137/318 |

FOREIGN PATENT DOCUMENTS

| | | | |
|---|---|---|---|
| 696523 | 10/1964 | Canada | 251/267 |
| 0572817 | 5/1993 | European Pat. Off. . | |
| 2709466 | 5/1980 | Germany . | |
| 3830395 | 1/1990 | Germany . | |
| 3744693 | 5/1992 | Germany . | |

Primary Examiner—George L. Walton
Attorney, Agent, or Firm—Benjamin J. Barish

[57] ABSTRACT

A tapping fitting for a pipe, preferably a plastic pipe, includes a rotatable blade assembly threaded within a sleeve non-rotatably received within a housing such that rotation of the blade assembly causes it to cut a cylindrical slug from the pipe to which the housing is attached. The opposite faces of the sleeve are exposed to the fluid pressure within the pipe thereby producing a balance of forces substantially eliminating transverse creep. In addition, the attaching section of the fitting is formed with a bore which is engageable by a sealing ring received around the rotatable blade assembly and which is of sufficient length to accommodate any axial creep, thereby enabling the blade assembly also to serve as a valve.

20 Claims, 4 Drawing Sheets

TAPPING FITTINGS

FIELD AND BACKGROUND OF THE INVENTION

The present invention relates to a tapping fitting for application to a pipe in order to direct fluid conducted therethrough to an ancillary device, such as a branch conduit or an outlet tap. The invention is particularly useful in electrofusion fittings for plastic pipes wherein the fitting is bonded to a plastic pipe by electrofusion, and is therefore described below with respect to this application, although it will be appreciated that the invention could also be used in other applications.

Tapping fittings of the foregoing type are known. They generally include a rotatable blade assembly formed with external threads threadedly received within the housing and including a cylindrical cutting blade such that rotation of the blade assembly moves it axially from an initial, retracted position within the housing, to a projected position, to cut a cylindrical slug from the plastic pipe to which the fitting is attached. Such tapping fittings are applied to the plastic pipe while the blade assembly is in its initial, retracted position, i.e., within the housing of the fitting. After the fitting has been so applied, the blade assembly is rotated from externally of the fitting to its projected position to cut a cylindrical slug from the plastic pipe, and then it is rotated in the opposite direction back to its initial, retracted position to remove the slug and retain it within the housing main section of the fitting. The fitting thus establishes communication between the plastic pipe and the ancillary device, and generally remains in place for the life of the installation.

Such tapping fittings have come into extensive use for tapping branch conduits to high-pressure liquid or gas supply pipes of a plastic material. The housing is generally made of polyethylene or of a similar plastic material as the pipe. It has been found, however, that the plastic material used for the housing tends to creep over a long period Of time. Transverse creep (i.e., transversely to the axial movement of the blade assembly) may result in the blade assembly jumping the threads; whereas axial creep may result in the failure of the valve to completely close.

OBJECTS AND BRIEF SUMMARY OF THE INVENTION

An object of the present invention is to provide a tapping fitting having advantages in the above respects.

The present invention relates to tapping fittings for application to a pipe, e.g., a plastic pipe, in order to direct fluid conducted therethrough to an ancillary device, comprising: a housing including a main section, an attaching section in axial alignment with the housing main section for attaching the fitting to a pipe, and an outlet section for directing the fluid from the pipe to the ancillary device; a rotatable blade assembly formed with external threads threadedly received within the housing main section and including a cylindrical cutting blade such that rotation of the blade assembly moves it axially from an initial, retracted position within the housing main section to a projected position through the attaching section to cut a cylindrical slug from the pipe to which the attaching section is attached; and a sleeve interposed between the rotatable blade assembly and the housing main section. The sleeve is non-rotatable with respect to the housing main section and is formed with internal threads threadedly receiving the external threads of the rotatable blade assembly such that rotation of the rotatable blade assembly moves it to its projected portion to cut the cylindrical slug from the pipe.

According to one aspect of the present invention, the opposite faces of the sleeve are exposed to the fluid pressure within the pipe, after the cylindrical slug has been cut therefrom, to produce a balance of forces on the opposite faces of the sleeve reducing or eliminating transverse creep in the sleeve. The housing of the tapping fitting may therefore be made of polyethylene or other plastic material of the plastic pipe to which it is to be attached, whereas the sleeve interposed between the rotatable blade assembly and the housing main section may be made of a very hard plastic material, such as an acetal resin, nylon, or the like. However, the high pressure within the housing applied equally to the opposite faces of the sleeve produces balanced pressure on the opposite faces of the sleeve which substantially reduces or eliminates transverse creep even after a long period of use of the installation.

According to further features in a described preferred embodiment, the rotatable blade assembly includes a mounting head at one end formed with the external threads, the mounting head being formed with a bore of non-circular cross-section. The fitting further includes a stem of corresponding cross-section as the bore and received in the bore for rotatating the rotatable blade assembly. The mounting head is formed with an inwardly-extending projection received within an axially-extending slot in the stem, which slot terminates in a stop engageable by the projection in the projected position of the rotatable blade assembly.

According to still further features in a described embodiment, the attaching section is formed with a bore of a diameter slightly larger than the outer diameter of the cylindrical cutting blade; and the outer surface of the cylindrical cutting blade carries a sealing ring received within the bore in the projected position of the blade assembly, thereby enabling the blade assembly to serve as a valve opening the passageway from the pipe to the ancillary device when the blade assembly is in the retracted position, and closing the passageway when the blade assembly is in the projected position. The bore is of sufficient length to accommodate any axial creep, which thereby enables the device also to be used as a reclosable valve. That is, in the projected position of the blade assembly, the sealing ring is in contact with the surface of the housing attaching section defining the bore along the length of the bore, despite the presence of axial creep in the housing, thereby enabling the fitting to accommodate axial creep. Preferably, the bore is of a length of 5–15 mm, it being 10 mm in the described preferred embodiment.

One preferred embodiment of the invention described below is a tapping fitting which includes such a reclosable valve, whereas a second described embodiment is a tapping fitting which is non-reclosable. In both described embodiments, the attaching section includes heater wires for bonding to the plastic pipe by electrofusion. It will be appreciated, however, that features of the invention could also be used in tapping fittings of other types.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a side elevational view illustrating the stem within the fitting housing used for rotating the blade assembly from externally of the housing;

FIG. 5 is an end elevational view of the stem of FIG. 4;

DESCRIPTION OF PREFERRED EMBODIMENTS

Figure 1:
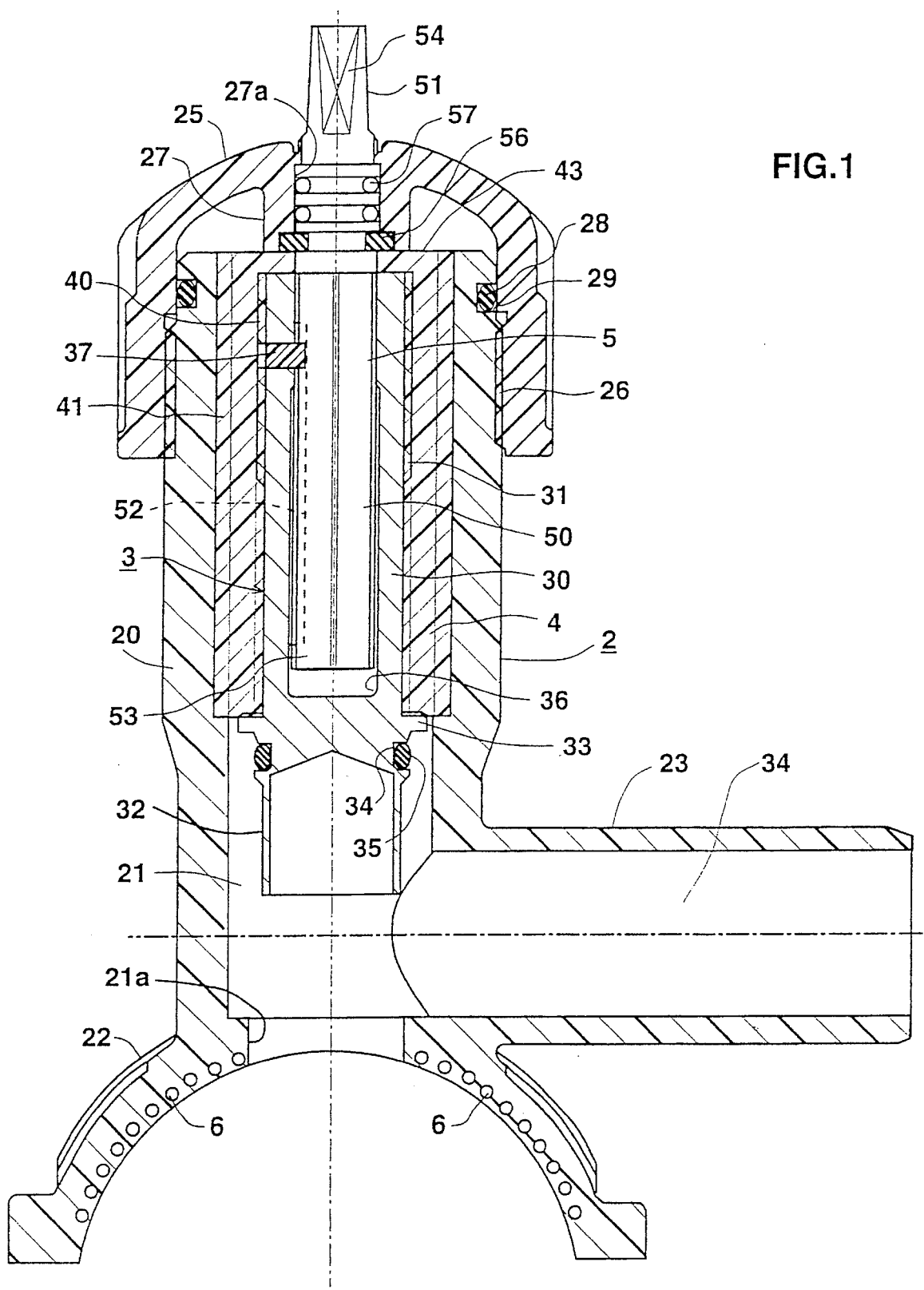
FIG. 1 is a longitudinal sectional view illustrating one form of tapping fitting constructed in accordance with the present invention, the rotatable blade assembly in the fitting being shown in its initial, retracted position within the fitting housing.

The tapping fitting illustrated in FIGS. 1–5 of the drawings incorporates a reclosable valve, such that once the tapping fitting is applied, the same fitting may also be used as a valve for controlling the flow of the fluid (liquid or gas) from a main supply pipe to an ancillary device, such as a branch conduit, an outlet tap, or the like.

The fitting illustrated in FIGS. 1–5 includes a housing, generally designated 2; a rotatable blade assembly 3 located within the housing; a sleeve 4 between the housing and blade assembly; and a stem 5 also located within the housing but projecting externally thereof to enable the blade assembly to be rotated from externally of the housing. Housing 2 is of a plastic material, usually the same material as the plastic pipe to which the fitting is to be applied. Housing 2 further includes electrical heater wires 6 which may be electrically energized to bond, by electrofusion, the tapping fitting 2 to the plastic pipe, as will be described more particularly below. After the fitting has been applied by electrofusion, the blade assembly 3 is rotated by rotating stem 5 in order to cut out a cylindrical slug from the plastic pipe and thereby to tap fluid therefrom to the ancillary device connected to the housing 2.

Housing 2 includes a main section 20 formed with an axially-extending bore 21 therethrough in which are located the rotatable blade assembly 3 and also the stem 5. Housing 2 further includes an attaching section 22 in axial alignment with the housing main section 20 and its bore 21 for attaching the fitting to a plastic pipe. Attaching section 22 is in the form of a saddle conforming to the curvature of the plastic pipe, and includes the electrical heater wires 6 which are electrically energized in order to bond the fitting to the plastic pipe by electrofusion. Bore 21 extending through the saddle section 22 is reduced in diameter, as shown at 21a. This section of the bore serves as a reclosable valve opening, as will be described more particularly below.

Housing 2 is further integrally formed with an outlet section 23 for directing the fluid from the plastic pipe, after having been bonded to the saddle 22, to an ancillary device, such as a branch conduit, outlet tap, or the like. Outlet section 23 is formed with a bore 24 extending perpendicularly to and communicating with axial bore 21 of the housing main section 20.

The opposite end of bore 21 through the housing main section 20 is closed by a cap 25 having threads 26 for attaching it to the housing main section 20. Cap 25 includes an inwardly extending stud 27 formed with a bore 27a therethrough for receiving the end of stem 5. A sealing ring 28 is received within an annular groove 29 in that end of the housing main section 20 for sealing the housing with respect to cap 25.

Rotatable blade assembly 3 includes a mounting head 30 having external threads 31 at one end, and a cylindrical blade 32 at the opposite end. As will be described below, blade assembly 3 is to be rotated by stem 5 from externally of the housing to move its cylindrical blade 32 from an initial, retracted position within the housing (FIG. 1), to a projected position extending through the saddle 22 and into the plastic pipe (not shown) to which the fitting is to be bonded by electrofusion. An annular rib 33 in head 30 of the blade assembly 3 limits against the inner surface of housing 2 circumsciling bore section 21a in the projected position of the cylindrical blade 32. The respective end of head 30 is formed with an annular recess 34 receiving a sealing ring 35 engageable with bore section 21a of the housing, enabling the rotatable blade assembly also to act as a reclosable valve.

Head 30 is further formed with an axially-extending bore 36 of non-circular (e.g., hexagonal) cross-section, which receives stem 5 used for rotating the blade assembly. A pin 37 at the upper end of head 30 serves as an inwardly extending projection projecting into bore 36 and is receivable within an axially-extending slot in stem 5, as will be described more fully below.

Sleeve 4, interposed between the rotatable blade assembly 3 and the main section 20 of the housing 2, is made of a hard plastic material, such as an acetal resin, nylon, or the like. It is formed with internal threads 40 engageable with the threads 31 of the rotatable blade assembly 3, and with outer axially-extending, circumferentially-spaced ribs 41 received within mating grooves 42 (FIG. 3) formed on the inner surface of the housing main section 20. Sleeve 4 is further formed at its upper end with an end wall 43, the inner surface of which is engageable by the upper edge of the rotatable blade assembly 3 to define the initial, or retracted, position of the blade assembly 3 as shown in FIG. 1. End wall 43 is apertured to accommodate stem 5. The outer surface of end wall 43 is engaged by stud 27 depending from the inner surface of cap 25 when the cap is threaded onto the housing, to thereby prevent any axial movement of the sleeve.

Figure 2:
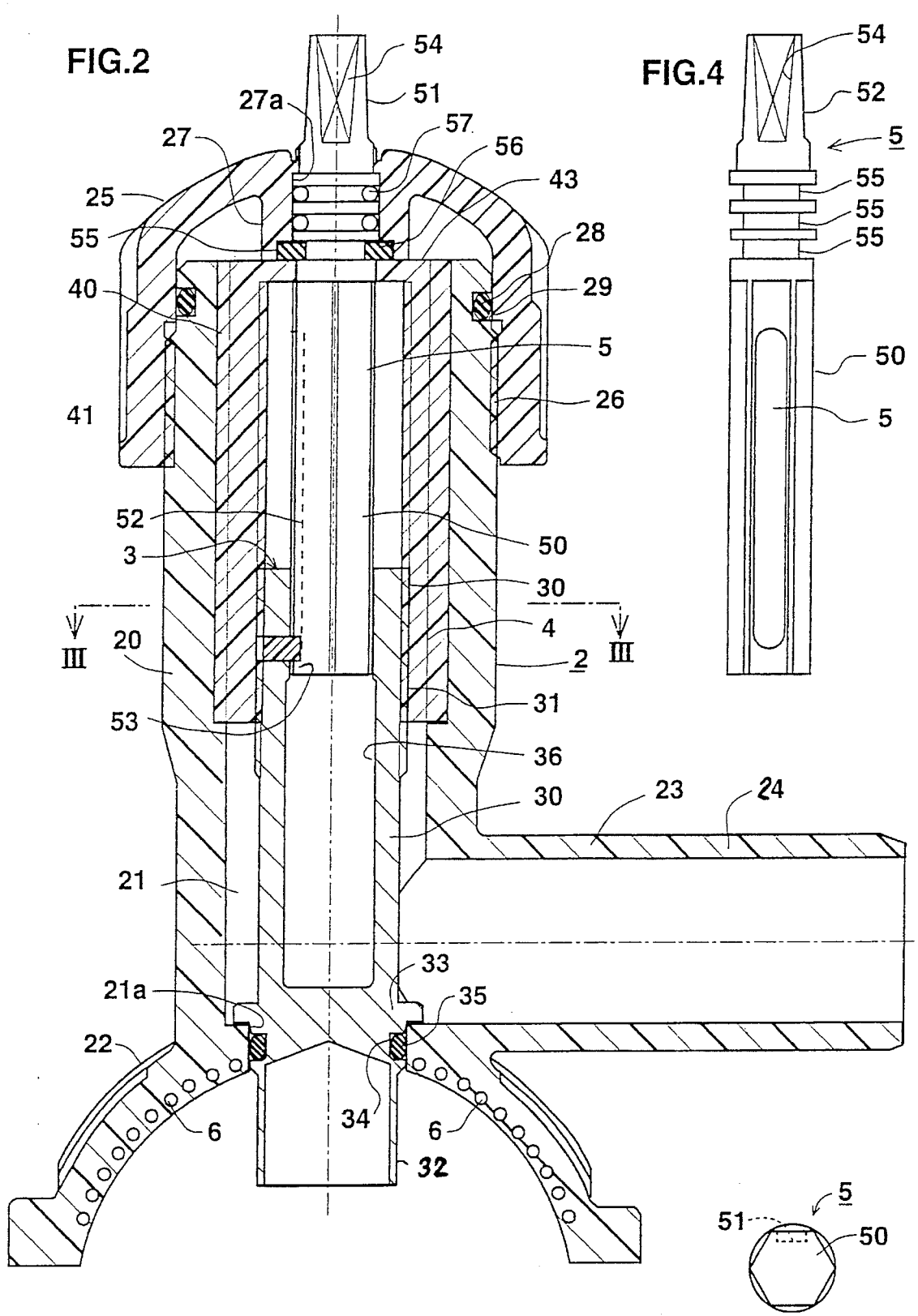
FIG. 2 is a view similar to that of FIG. 1 but showing the rotatable blade assembly moved to its projected position extending through the housing for cutting a slug from a plastic pipe to which the fitting is applied.
Figure 3:
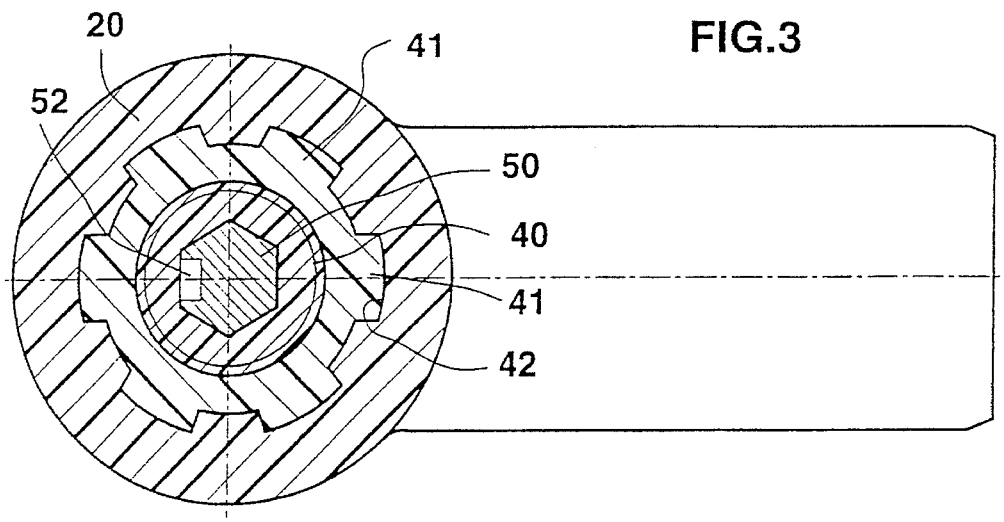
FIG. 3 is a sectional view along line III-III of FIG. 2.

Stem 5 is formed with an inner section 50 located within housing 2, and with an outer section 51 projecting externally through opening 27 of cap 25 closing the end of the housing. Section 50 is of the same non-circular (e.g., hexagonal) cross-section as bore 36 of the blade assembly 3 in which it is received, and is formed with an axially-extending slot 52 receiving pin 37 of the blade assembly. Slot 52 terminates short of the inner end of stem section 50 to define a stop 53 engageable by pin 37 at the projected position of the blade assembly as shown in FIG. 2. The outer section 51 of stem 5 has slanted faces 54 for receiving a wrench or the like in order to rotate the stem, and thereby the blade assembly 3 within the housing.

The juncture of the two sections 50 and 51 of the stem 5, passing through opening 27 of the housing cap 25, is formed with three axially-spaced annular grooves 55. A retainer ring 56 is located within the inner groove 55, and two sealing rings 57 are located within the other two grooves, to positively seal the interior of the housing from the atmosphere.

The fitting illustrated in FIGS. 1–5 is used in the following manner for producing a tap between a plastic pipe, e.g., a high-pressure gas pipe, and an ancillary device, such as a branch pipe or outlet tap.

The fitting is applied by seating the saddle 22 over the plastic pipe (not shown), with the blade assembly 3 in its normal retracted position as shown in FIG. 1. The ancillary device, e.g., a branch conduit or outlet tap, is applied to sleeve 23 of the fitting. Heater wires 6 are then electrically energized to bond the saddle section 22 of the fitting to the plastic pipe by electrofusion.

After the fitting has been so bonded, a wrench is applied to the external section 51 of stem 5 and is rotated, which thereby also rotates the blade assembly 3. This rotation of the blade assembly rotates the cylindrical blade 32 and also moves it axially, by virtue of its outer threads 31 engaging the inner threads 40 in sleeve 4, to project the cylindrical blade 32 through saddle 22 and into the plastic pipe to which the saddle is electrofused. Stem 5 is thus rotated until pin 37 moving within slot 52 of the stem engages stop 53 at the end of the stem, at which point the annular rib 33 also engages the inner surface of housing 2 circumscribing bore section 21a. The above movement of the blade assembly 3 causes its cylindrical blade 32 to cut out a cylindrical slug from the plastic pipe.

Stem 5 is then rotated in the opposite direction to thereby also rotate the blade assembly 3 in the opposite direction, to withdraw the cylindrical blade 32 to its initial retracted position within the housing as shown in FIG. 2. Communication is thus established between the interior of the plastic pipe electrofused to saddle 22, and the ancillary device coupled to the outlet section 23 of the housing. Pin 37 moving within slot 52 thus permits axial movement of the blade assembly 3 and allows the blade assembly to move in the axial direction either to its extended position wherein the sealing ring 35 seals the interior of housing 2 with respect to the plastic pipe to which the fitting is attached, or to a retracted position (FIG. 1) establishing communication between the interior of housing 2 with respect to the plastic pipe to which the fitting is attached.

It will be seen that when the blade assembly 3 is in its projected position (FIG. 2), sealing ring 35 is engageable with the inner surface of bore section 21a, thereby sealing the interior of housing 2 with respect to the plastic pipe to which the fitting is attached. Since bore section 21a engaged by sealing ring 35 is of significant length, the seal will be effected even where there is some creep in the housing in the axial direction, i.e., in the same direction as the axial movement of the blade assembly 3. This construction, including sealing ring 35 engageable with bore section 21a, thus neutralizes the effects of axial creep, and also enables the fitting to serve as a valve which may be opened by moving the blade assembly 3 to its retracted position (FIG. 1), and closed by moving it to its projected position (FIG. 2).

It will also be seen that in the construction illustrated in FIGS. 1–5, neither the inner face nor the outer face of sleeve 4 is sealed, and therefore the high pressure within housing 2 will be applied to both faces of the sleeve. This balances the pressure on the opposite faces of the sleeve. This, together with the fact that the sleeve is made of hard plastic material, substantially reduces or eliminates creep in the transverse direction such as would produce leakage between the threads of the sleeve and the blade assembly.

Figure 8:
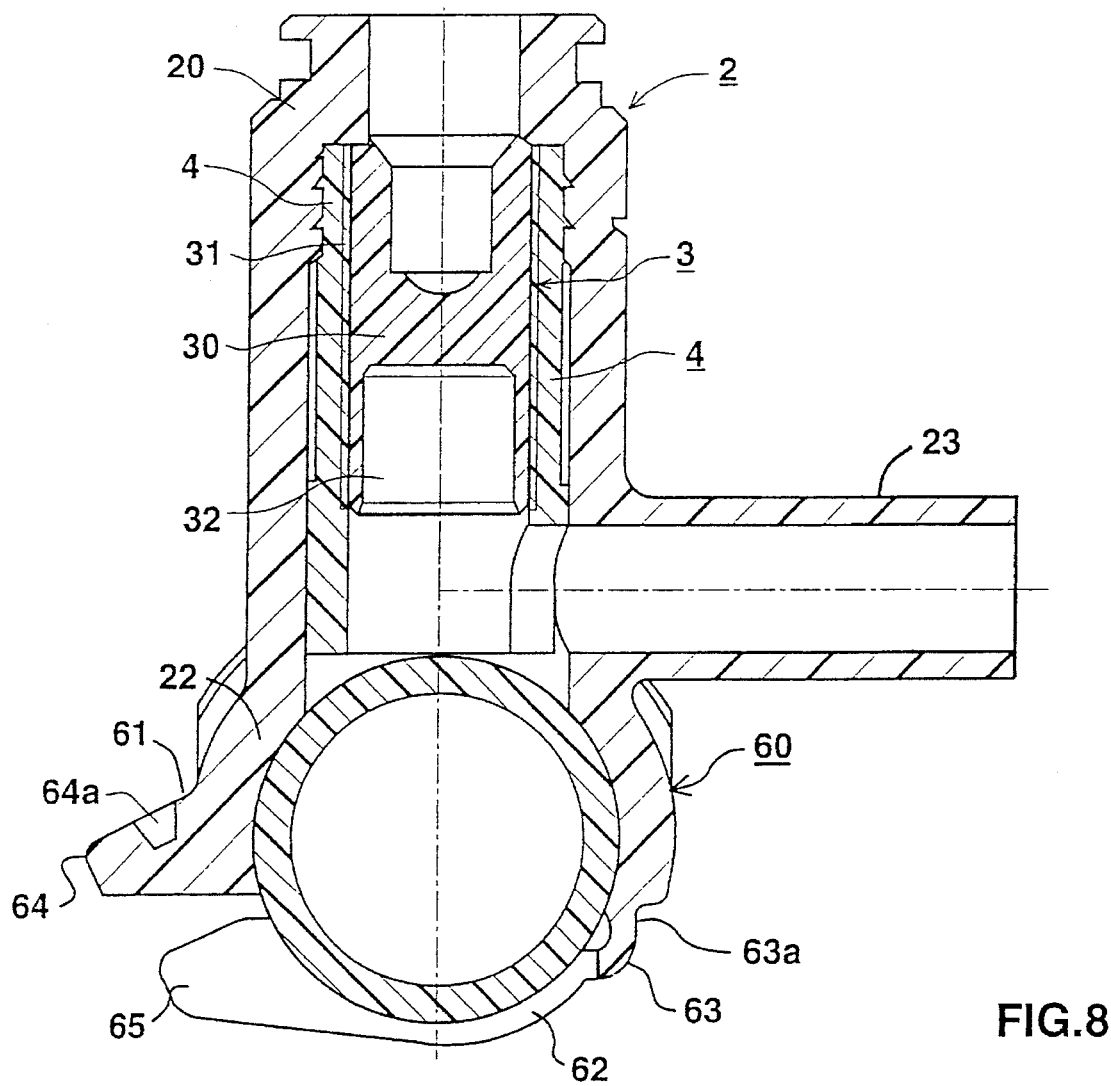
FIG. 8 is a longitudinal sectional view of the fitting of FIGS. 6 and 7 with various parts removed.
Figure 6:
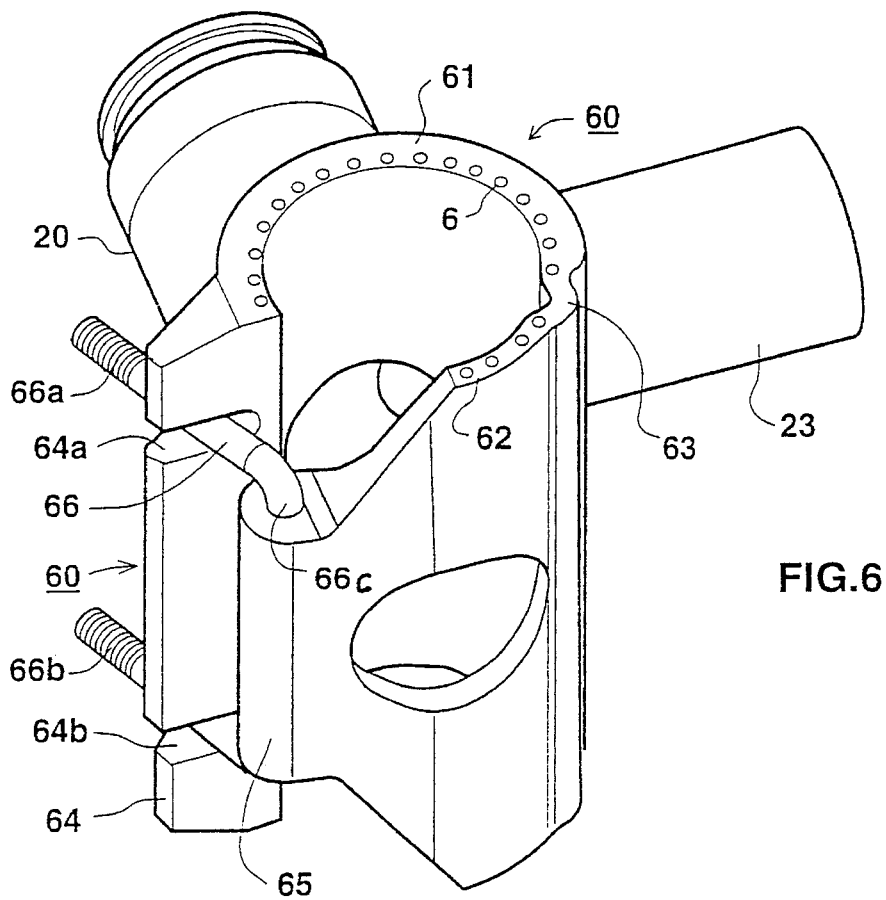
FIG. 6 is a perspective view illustrating another form of tapping fitting including a different construction of saddle for applying the fitting to the plastic pipe to be tapped.
Figure 7:
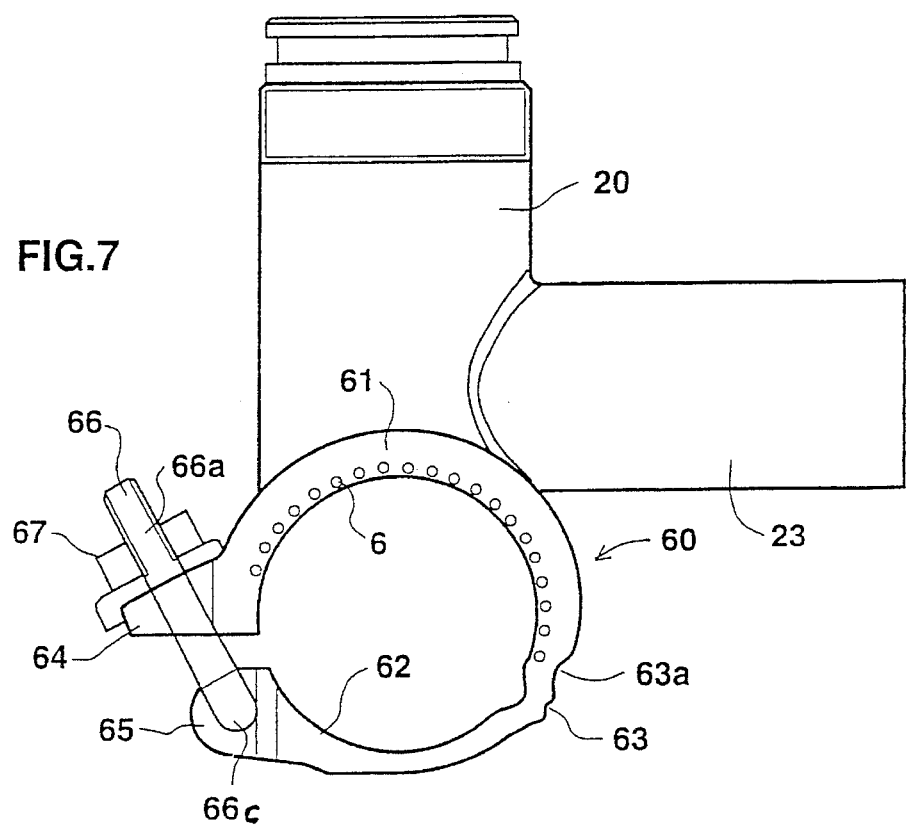
FIG. 7 is an end elevational view of the fitting of FIG. 6.

The Embodiment of FIGS. 6–8

FIGS. 6–8 illustrate a tapping fitting of similar construction as described above with respect to FIGS. 1–5. One difference is in the structure of the saddle, therein generally designated 60, to facilitate the application of the fitting to the plastic pipe before the fitting is bonded thereto by electrofusion. Another difference is that the fitting illustrated in FIGS. 6–8 does not include a reclosable valve as in FIGS. 1–5.

As shown in FIGS. 6–8, saddle 60 is integrally formed with two jaws 61, 62 interconnected by an intergral hinge 63 to permit the two jaws to be moved to an open or closed position. Jaw 61 is formed with a bead 64 extending axially of the saddle section (perpendicularly to the fitting housing 2). Similarly, jaw 62 is formed with a bead 65 also extending axially of the saddle section.

A U-shaped fastener pin, generally designated 66, is pivotally mounted within bead 65 of jaw 62, and cooperates with bead 64 of jaw 61 for locking the saddle in its closed condition. Thus, U-shaped pin 66 includes two parallel legs 66a, 66b joined by an intermediate leg 66c. Leg 66c is pivotally embedded within bead 65 of jaw 62, whereas bead 64 is formed with two parallel slots 64a, 64b adapted to receive the parallel legs 66a, 66b, respectively, of pin 66 in the closed condition of the saddle. The outer ends of the two parallel legs 66a, 66b are threaded and receive nuts 67 (FIG. 7) to lock the pin, and thereby the saddle, in its closed condition.

It will thus be seen that the saddle 60 may be easily applied to the plastic pipe by: pivotting the two jaws 61, 62 to enclose the pipe; then pivotting the U-shaped pin 66 to cause its legs 66a, 66b to be received within slots 64a, 64b; and finally applying the nuts 67 over the threaded ends of the pin legs to thereby lock the saddle in its closed condition. After the saddle has been so applied to the plastic pipe, the electrical heater wires 6 (FIGS. 1, 2) are energized to bond the fitting to the plastic pipe by electrofusion, and the rotatable blade assembly 3 is then actuated to cut-out a cylindrical slug from the plastic pipe, all as described above with respect to FIGS. 1–5.

As seen particularly in FIG. 7, the integral hinge 63 is formed with an elastic bend, as shown at 63a. This enables the saddle to be expanded, and thereby to be applied to pipes of slightly varying diameters.

The internal structure of the fitting of FIGS. 6–8 basically is the same as described above with respect to FIGS. 1–5, and to facilitate understanding, corresponding parts are identified by the same reference numerals in FIG. 8. It will be seen in FIG. 8, however, that this fitting does not include the sealing ring 35. Accordingly, this fitting is not intended to be used also as a reclosable valve, as the fitting of FIGS. 1–5. In substantially all other respects, the fitting of FIGS. 6–8 is constructed and operates in substantially the same manner as described above with respect to the fitting of FIGS. 1–5.

While the invention has been described with respect to two preferred embodiments including electrofusion, it will be appreciated that these are set forth merely for purposes of example, and that the invention could also be used with respect to other types of fittings not involving electrofusion. Many other variations, modifications and applications of the invention will be apparent.

I claim:

1. A tapping fitting for application to a pipe in order to tap a fluid conducted therethrough to an ancillary device comprising:

a housing including a main section, an attaching section in axial alignment with the housing main section for attaching the fitting to a pipe, and an outlet section for directing the fluid from the pipe to the ancillary device;

a rotatable blade assembly having external threads threadedly received within said housing main section and including a cylindrical cutting blade such that rotation of the blade assembly moves it axially from an initial, retracted position within the housing main section to a projected position through said attaching section to cut a cylindrical slug from the pipe to which the attaching section is attached;

and a sleeve interposed between said rotatable blade assembly and said housing main section, said sleeve being non-rotatable with respect to said housing main section and having internal threads threadedly receiving said external threads of the rotatable blade assembly such that rotation of the rotatable blade assembly moves it to its projected position as it cuts said cylindrical slug from the pipe, the opposite faces of said sleeve being exposed to the fluid pressure within said pipe, after said cylindrical slug has been cut therefrom, to produce a balance of forces on the opposite faces of the sleeve reducing transverse creep in said sleeve.

2. The fitting according to claim 1, wherein said sleeve includes a plurality of axially-extending circumferentially-spaced ribs on its outer surface receivable within complementary grooves formed on the inner surface of the housing main section to prevent rotation of the sleeve during rotation of the rotatable blade assembly.

3. The fitting according to claim 1, wherein said rotatable blade assembly includes a mounting head at one end formed with said external threads, said mounting head being formed with a bore of non-circular cross-section; said fitting further including a stem of corresponding cross-section as said bore and received in said bore for rotatating said rotatable blade assembly; said mounting head having an inwardly-extending projection received within an axially-extending slot in said stem, which slot terminates in a stop engageable by said projection in the projected position of the rotatable blade assembly.

4. The fitting according to claim 1, wherein said attaching section includes a bore of a diameter slightly larger than the outer diameter of said cylindrical cutting blade and of a length to accommodate axial creep in the housing; the outer surface of said cylindrical cutting blade carrying a sealing ring received within said bore in the projected position of said blade assembly, thereby enabling the blade assembly to serve as a valve opening the passageway from said pipe to said ancillary device when the blade assembly is in said retracted position, and closing said passageway when the blade assembly is in said projected position.

5. The fitting according to claim 4, wherein said housing main section includes an annular shoulder adjacent said attaching section engageable with the rotatable blade assembly when in its projected position.

6. The fitting according to claim 1, wherein said sleeve includes an annular shoulder at its end remote from the attaching section engageable with the end of the rotatable blade assembly in the latter's initial, retracted position within the housing main section.

7. The fitting according to claim 6, wherein said housing main section is closed by a cap, said cap including a stem engageable with said end wall of the sleeve to prevent axial movement of the sleeve outwardly of the housing main section when the cap is threaded thereon.

8. The fitting according to claim 1, wherein said pipe is a plastic pipe, and said attaching section includes heater wires for bonding said attaching section to the plastic pipe by electrofusion.

9. The fitting according to claim 1, wherein said attaching section of a saddle conforming to the curvature of the pipe to which it is attached.

10. The fitting according to claim 9, wherein said saddle is of plastic and is integrally with a pair of curved jaws enclosing the plastic pipe, said jaws being interconnected at one side by an integral hinge, and being connectible together at the opposite side by a fastener.

11. The fitting according to claim 10, wherein said fastener includes a U-shaped pin having two parallel legs joined by an intermediate leg; said intermediate leg being pivotally mounted in one of said jaws from an open position to a closed position, the other of said jaws having parallel slots for receiving the two parallel legs of said pin when pivotted to said closed position; said fastener further including nuts threaded onto the ends of said two parallel legs when in said slots to lock them in said closed position within said slots.

12. The fitting according to claim 10, wherein said integral hinge includes an elastic bend permitting the two jaws to be expanded and thereby to be applied to pipes of different outer diameters.

13. A tapping fitting for application to a pipe in order to tap a fluid conducted therethrough to an ancillary device, comprising:

a housing including a main section, an attaching section in axial alignment with the housing main section for attaching the fitting to a pipe, and an outlet section for directing the fluid from the pipe to the ancillary device;

and a rotatable blade assembly having external threads threadedly received within said housing main section and including a cylindrical cutting blade such that rotation of the blade assembly moves it axially from an initial, retracted position within the housing main section to a projected position through said attaching section to cut a cylindrical slug from the pipe to which the attaching section is attached;

said rotatable blade assembly including a mounting head at one end formed with said external threads, said mounting head having a bore of non-circular cross-section;

said fitting further including a stem of corresponding cross-section as said bore and received in said bore for rotatating said rotatable blade assembly;

said mounting head being formed with an inwardly-extending projection received within an axially-extending slot in said stem, which slot terminates in a stop engageable by said projection in the projected position of the rotatable blade assembly.

14. The tapping fitting according to claim 13, further including a sleeve interposed between said rotatable blade assembly and said housing main section, said sleeve being non-rotatable with respect to said housing main section and having internal threads threadedly receiving said external threads of the rotatable blade assembly such that rotation of the rotatable blade assembly moves it to its projected position as it cuts said cylindrical slug from the pipe.

15. The tapping fitting according to claim 14, wherein the opposite faces of said sleeve are exposed to the fluid pressure within said pipe, after said cylindrical slug has been cut therefrom, to produce a balance of forces on the opposite faces of the sleeve reducing transverse creep in said sleeve.

16. The tapping fitting according to claim 13, wherein said attaching section has a bore of a diameter slightly larger than the outer diameter of said cylindrical cutting blade; the outer surface of said cylindrical cutting blade carrying a sealing ring received within said bore in the projected position of said blade assembly, thereby enabling the blade assembly to serve as a valve opening the passageway from said pipe to said ancillary device when the blade assembly is in said retracted position, and closing said passageway when the blade assembly is in said projected position.

17. A tapping fitting for application to a pipe in order to a tap fluid conducted therethrough to an ancillary device, comprising:

a housing including a main section, an attaching section in axial alignment with the housing main section for attaching the fitting to a pipe, and an outlet section for directing the fluid from the pipe to the ancillary device;

and a rotatable blade assembly having external threads threadedly received within said housing main section and including a cylindrical cutting blade such that rotation of the blade assembly moves it axially from an initial, retracted position within the housing main section to a projected position through said attaching section to cut a cylindrical slug from the pipe to which the attaching section is attached;

said attaching section having a bore of a diameter slightly larger than the outer diameter of said cylindrical cutting blade and of a length to accommodate axial creep in the housing;

the outer surface of said cylindrical cutting blade carrying a sealing ring received within said bore in the projected position of said blade assembly and in sealing contact with the surface of said attaching section defining said bore, thereby enabling the blade assembly to serve as a valve opening the passageway from said pipe to said ancillary device when the blade assembly is in said retracted position, and closing said passageway when the blade assembly is in said projected position by the sealing contact of said seal with said surface of the attaching section defining said bore along the length of the bore despite the presence of axial creed in the housing.

18. The tapping fitting according to claim 17, wherein said rotatable blade assembly includes a mounting head at one end having with said external threads, said mounting head having a bore of non-circular cross-section; said fitting further including a stem of corresponding cross-section as said bore and received in said bore for rotatating said rotatable blade assembly; said mounting head including an inwardly-extending projection received within an axially-extending slot in said stem, which slot terminates in a stop engageable by said projection in the projected position of the rotatable blade assembly.

19. The tapping fitting according to claim 17, further including a sleeve interposed between said rotatable blade assembly and said housing main section, said sleeve being non-rotatable with respect to said housing main section and having internal threads threadedly receiving said external threads of the rotatable blade assembly such that rotation of the rotatable blade assembly moves it to its projected position as it cuts said cylindrical slug from the pipe, the opposite faces of said sleeve being exposed to the fluid pressure within said pipe, after said cylindrical slug has been cut therefrom, to produce a balance of forces on the opposite faces of the pipe reducing transverse creep in said sleeve.

20. The tapping fitting according to claim 17, wherein said housing main section includes an annular shoulder adjacent said attaching section engageable with the rotatable blade assembly when in its projected position.

* * * * *